R. C. HILL.
SEWER TRAP.
APPLICATION FILED MAR. 24, 1909.
945,534.
Patented Jan. 4, 1910.
4 SHEETS—SHEET 1.
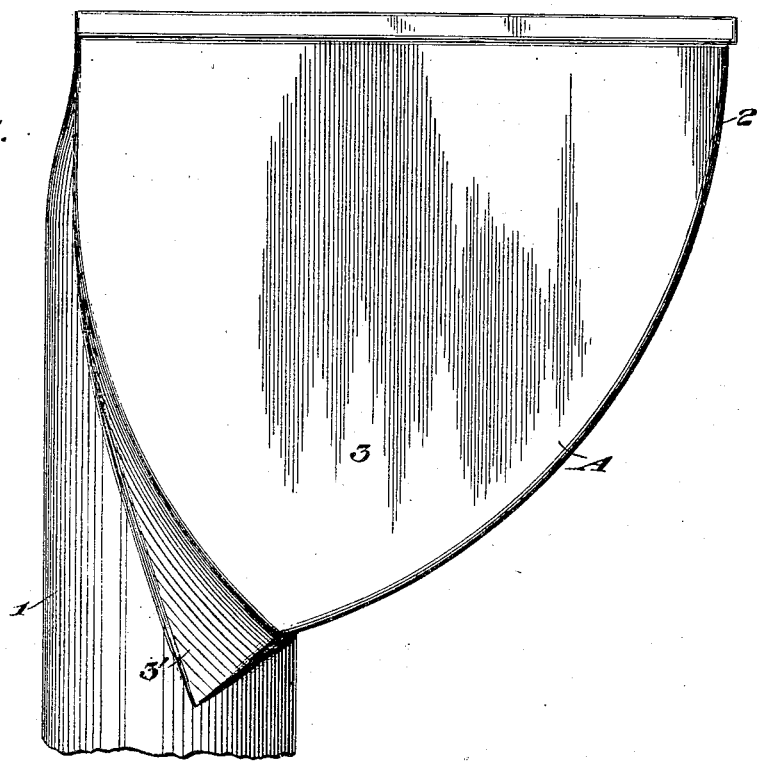
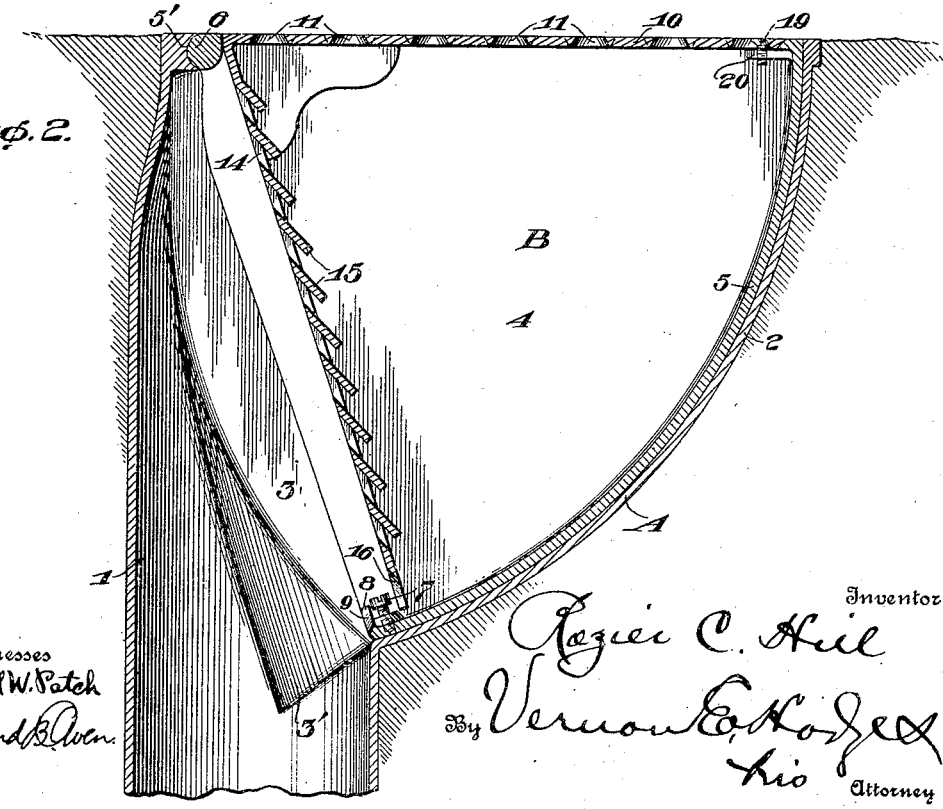

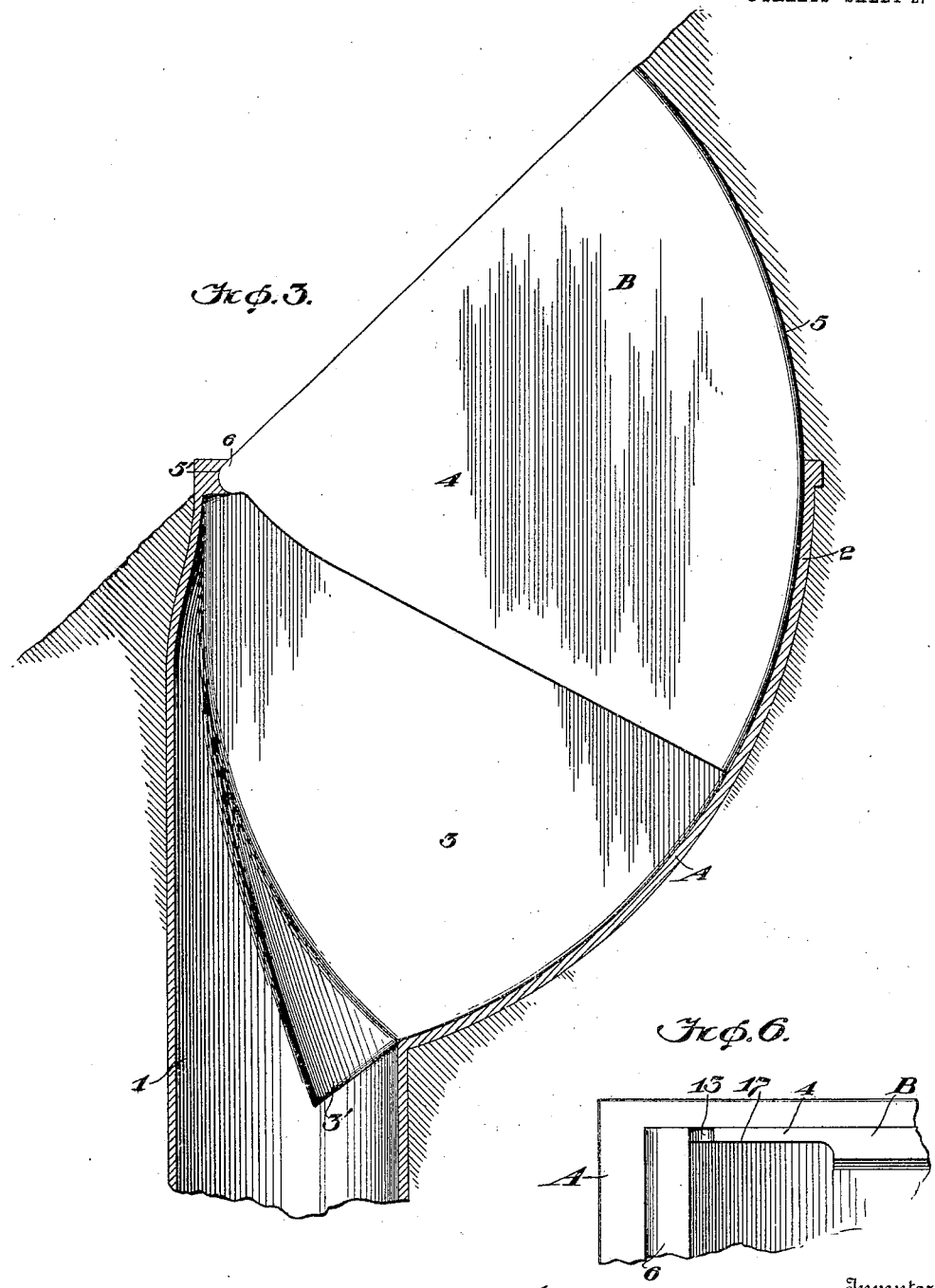

R. C. HILL.
SEWER TRAP.
APPLICATION FILED MAR. 24, 1909.

945,534.

Patented Jan. 4, 1910.
4 SHEETS—SHEET 3.

Witnesses
Lloyd W. Patch
Richard B. Owen

Inventor
Rozier C. Hill
By Vernon E. Hodge
his Attorney

R. C. HILL.
SEWER TRAP.
APPLICATION FILED MAR. 24, 1909.
945,534.
Patented Jan. 4, 1910.
4 SHEETS—SHEET 4.
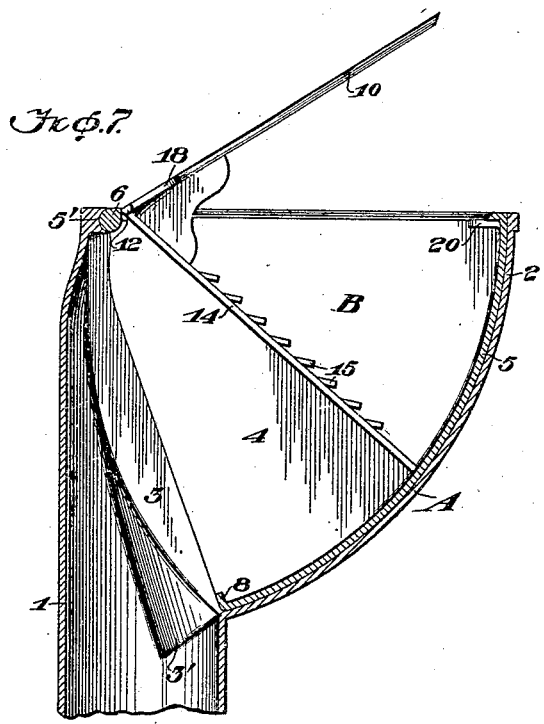
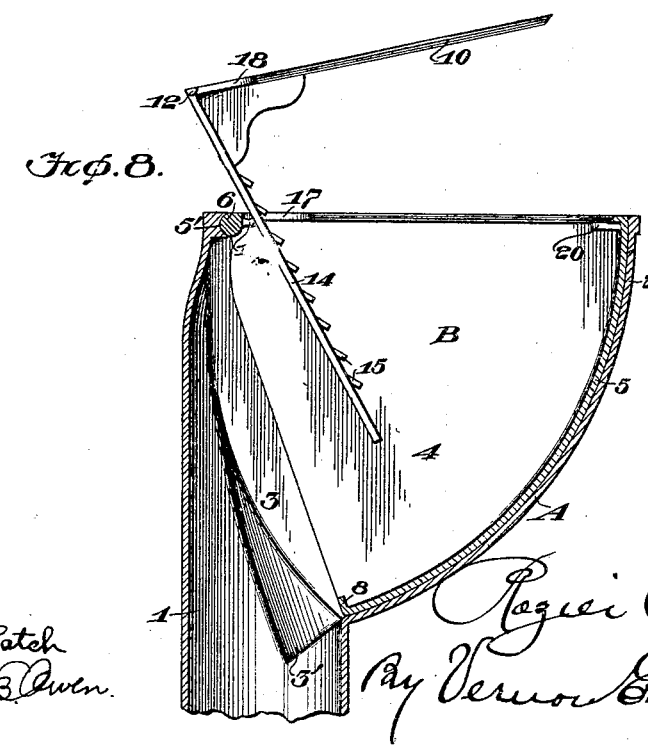
Witnesses
Lloyd W. Patch
Richard B. Owen.
Inventor
Roger C. Hill
By Vernon E. Hodges
his Attorney

UNITED STATES PATENT OFFICE.

ROZIER C. HILL, OF WASHINGTON, DISTRICT OF COLUMBIA, ASSIGNOR OF ONE-THIRD TO MARTIN J. FRAAS AND ONE-THIRD TO JOHN PEPPER, OF WASHINGTON, DISTRICT OF COLUMBIA.

SEWER-TRAP.

945,534.      Specification of Letters Patent.      Patented Jan. 4, 1910.

Application filed March 24, 1909. Serial No. 485,455.

*To all whom it may concern:*

Be it known that I, ROZIER C. HILL, a citizen of the United States, residing at Washington, District of Columbia, have invented certain new and useful Improvements in Sewer-Traps, of which the following is a specification.

This invention relates to an improvement in fittings for sewer pipes, and the object is to permit air to be admitted through the openings in the top of the trap, and a further object is a provision whereby the trap can be adjusted to any inclination of terrace or can be used directly upon a smooth or flat lawn.

Another object is in the provision of means for catching any sticks or other material which might be inserted through the openings of the trap and prevent the material from passing down the pipe and clogging the sewer.

The invention consists of certain novel features of construction and combinations of parts which will be hereinafter fully described and pointed out in the claims.

Figure 4:
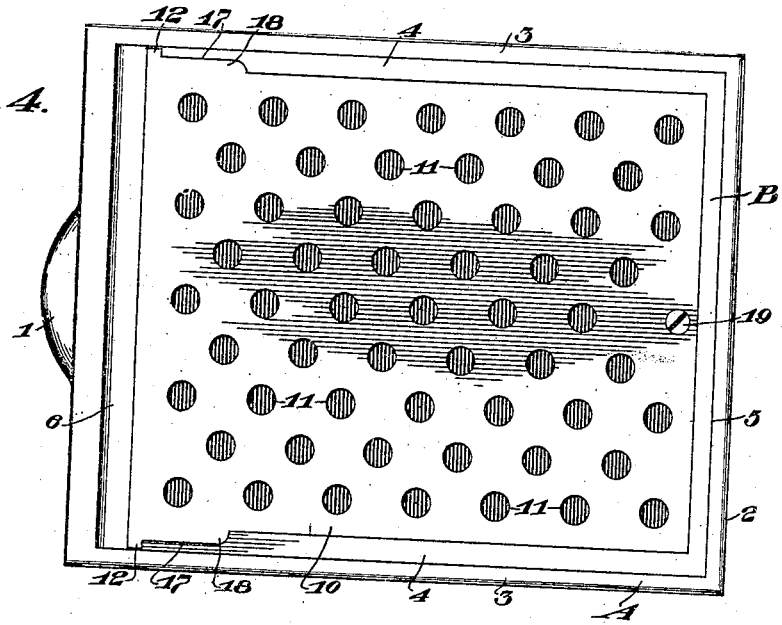
Figure 5:
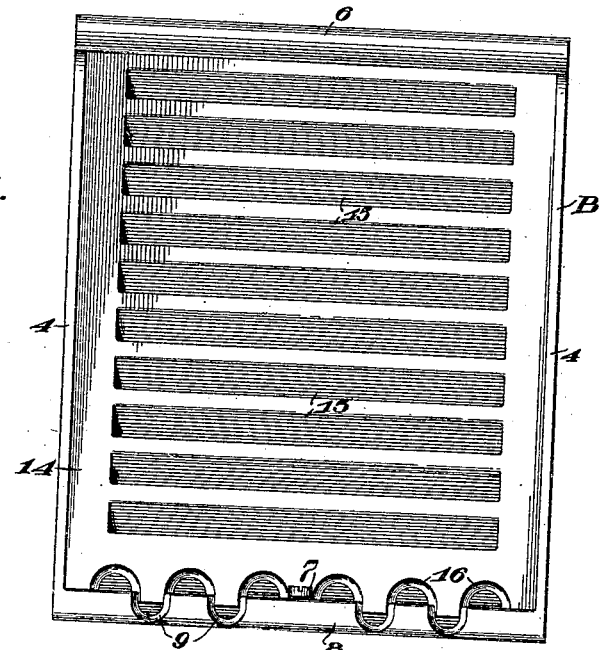

In the accompanying drawings—Figure 1 is a view in side elevation; Fig. 2 is a vertical longitudinal sectional view; Fig. 3 is a vertical sectional view showing the movable box in side elevation adjusted to one of its positions in the fitting for use when the fitting is applied to a terrace or sloping surface; Fig. 4 is a top plan view; Fig. 5 is a rear view of the box showing the grating which is connected to the cover or top of the fitting; Fig. 6 is a detailed view showing the manner in which the cover is mounted upon the box; Fig. 7 is a view in section showing the cover open sufficient to permit of any foreign matter being removed from the grating, and Fig. 8 is a view showing the manner of removing the grating from the box.

A represents the fitting and 1 the tubular portion for connecting the fitting to the piping necessary to connect the fitting with a sewer. The main portion of the fitting extends outwardly from the tubular member 1 in the arc of a circle as at 2, and the sides 3 are preferably flat and the lower ends tapering as at 3' down to the tubular member 1 for forming the inner surface of the fitting of such a shape as to permit of the water or dirt which may enter through the openings in the cover to pass down the tubular member 1 into the sewer. Along the rear end of the fitting and at the top a groove or socket 5 is formed in which is received the rounded end 6 of the box 4, which is adapted to be received within the fitting A. The sides 4 and the end 5 conform to the sides and ends 2 of the fitting A. The end 5 of the box is curved or formed in the arc of a circle so that the box can be moved within the fitting A by the pivotal connection between the box and fitting as at 5 and 6. A thumb screw 7 is received in the box B and is adapted to engage the surface of the forward end 2 of the fitting for holding the box B in any of its adjusted positions by simply turning the screw so that a proper locking connection is formed between the box and fitting. The top and bottom of the box are both open. The box is constructed practically triangular in shape, and the lower surface is practically in a diagonal direction from the pivotal connection at 5 and 6 to the upper portion of the tubular member 1, where it extends upwardly conforming to the surface of the end or wall 2 and the sides 3. The lower edge of the end 5 of the box B is provided with a ledge 8, which has openings 9 through which water and dirt will pass into the tubular member 1.

Mounted on the box is a cover 10, which is provided with holes or openings 11. These openings are ground out from the inside so that it will be impossible for any dirt or foreign matter to clog and close the openings and water can always pass through the openings into the box and down the tubular member to the sewer. The cover is provided with trunnions 12 which are received in recesses 13 formed in the box, which permits of the cover having a partial swinging movement.

Connected to the pivoted end of the cover is a grating 14 which extends downwardly into the box B, and the lower end of the grating is received in advance of the ledge 8. The grating is provided with inclined bars 15, which are spaced apart a sufficient distance to permit of the passage of water but close enough to prevent sticks or other foreign matter from passing down into the sewer through the tubular member 1. The lower edge of the grating is cut away at intervals for forming passages 16 to permit of the dirt and water passing down the box and into the tubular member 1. The openings or passages 9 and the openings or passages 16 are not in direct alinement with each other, but are arranged zig-zag or staggered with respect to each other. The lower edge of the grating does not come in contact with the lower surface of the wall or end 5 so that the water and dirt are permitted to pass through the openings or passages 9 without any hindrance.

The upper edge 4 of the box B is cut away for a short distance as at 17 at the rear end on each side, and the flanged portion 18 of the cover 10 is received in the cutaway portion 17. The object of this is to permit the cover 10 to swing outwardly for a short distance carrying the grating 14 upward in the box B. The cover can be raised sufficiently to permit the hand of a person to pass into the box B and remove any foreign matter which may have entered the box through the openings 11 in the cover and remove them before the grating is removed from the drum. After the foreign matter has been removed the cover is then drawn upwardly drawing the grating out of the box B through the cutaway portion 17.

The cover is held in position upon the box B when in closed position by a screw 19 which passes through the cover and into a flange 20 in the box.

From the foregoing it will be seen that by the adjustment of the box B the fitting can be used on any inclined terrace without forming any obstruction, and at the same time forming a superior means for conducting the water and dirt down to the sewer over the devices which are generally used. The cover 10 of the box B is constructed with the usual openings and is provided with a grating which extends into the box and prevents sticks and other foreign matter from passing down into the piping leading to the sewer and forming an obstruction. The cover, being pivotally mounted in the cover, permits of the grating being drawn toward the top of the box whereby any foreign matter can be removed from the box before the grating is removed.

It is evident that more or less slight changes might be made in the form and arrangement of the several parts described without departing from the spirit and scope of the invention, and hence it is not desired to limit the invention to the exact construction herein set forth, but:

Having fully described the invention, what is claimed as new and is desired to secure by Letters Patent is:—

1. The combination with a fitting having a perforated cover pivotally mounted thereon, and a grating connected to the cover for catching foreign matter passing through the cover.

2. The combination with a fitting having a perforated cover pivotally mounted thereon, and a grating integrally connected to the cover for catching foreign matter passing through the cover.

3. In a sewer trap, the combination with a box having one wall curved in the arc of a circle, of a combined cover and grating pivotally mounted in the box approximately at the center from which said arc is struck, whereby when the cover is lifted, the grating will follow the curved wall and lift any foreign matter caught by the grating and prevent its passing the latter.

4. The combination with a fitting, of a box adjustably mounted therein to the inclination of the terrace, and a cover for the box.

5. The combination with a fitting, of a box pivotally and adjustably mounted therein to the inclination of the terrace, and a cover for the box.

6. The combination with a fitting, of a box pivotally mounted therein, a cover on the box, and a grating connected to the cover extending into the box for catching any foreign matter entering the box.

7. The combination with a fitting, of a box pivotally mounted thereon, means for adjusting the box for different inclined surfaces, a cover on the box, and a grating connected to the cover extending into the box.

8. The combination with a fitting, of a box pivotally and adjustably mounted in the fitting, a cover pivotally mounted on the box, and a grating connected to the cover extending into the fitting, said cover and grating capable of being removed from the box.

9. The combination with a fitting having two sides and an arcuated end connecting said sides, and a box approximately corresponding in shape with said walls of the fitting, and telescopically pivoted therein, and a cover for the box.

10. The combination with a fitting having two sides and an arcuated end connecting said sides, and a box approximately corresponding in shape with said walls of the fitting, and telescopically pivoted therein, and a cover for the box, said cover having a grating connected therewith, and constructed and adapted to fit and traverse said inner walls of the box, whereby to prevent foreign matter and debris from passing, and assisting in the removal of the same when the trap is to be cleaned.

11. In a sewer trap, the combination with a fitting, of a cover pivotally mounted thereon, and a grating connected to the cover for catching foreign matter passing through the cover, said grating provided with overlapping inclined bars spaced apart a sufficient distance to permit the passage of water, and close enough to prevent sticks or other foreign matter from passing into the sewer.

In testimony whereof I affix my signature, in the presence of two witnesses.

ROZIER C. HILL.

Witnesses:
   MARTIN J. FRAAS,
   JOHN PEPPER.